United States Patent

Izzi et al.

[15] 3,658,574
[45] Apr. 25, 1972

[54] ADHESIVE TAPE AND METHOD OF MAKING SAME

[72] Inventors: Clement David Izzi, Somerville; Charles Roland Youngman, South Plainfield, both of N.J.

[73] Assignee: Nashua Corporation, Nashua, N.H.

[22] Filed: May 23, 1969

[21] Appl. No.: 828,444

Related U.S. Application Data

[63] Continuation of Ser. No. 572,349, Aug. 15, 1966, abandoned.

[52] U.S. Cl. ................................117/76, 117/68.5, 117/122
[51] Int. Cl. ..........................................C03c 25/02, C09j 7/04
[58] Field of Search ..............117/122 P, 122 PB, 76 T, 76 A, 117/126 GR, 68.5

[56] References Cited

UNITED STATES PATENTS

| 2,862,613 | 12/1958 | Klemka et al. | 117/68.5 X |
| 2,884,342 | 4/1959 | Wolff | 117/122 |
| 3,231,419 | 1/1966 | Korpman | 117/68.5 |

*Primary Examiner*—William D. Martin
*Assistant Examiner*—D. Cohen
*Attorney*—Kenway, Jenny & Hildreth

[57] ABSTRACT

A pressure sensitive adhesive tape having good electrical properties comprising a liquid permeable backing tape of cotton, glass fibers, rayon acetate, or the like, sufficiently impregnated with polyvinyl carhamate as a release agent that the opposite side of the strip are coated therewith, and any conventional thermoplastic adhesive material as a layer on at least one side of the backing tape.

2 Claims, 1 Drawing Figure

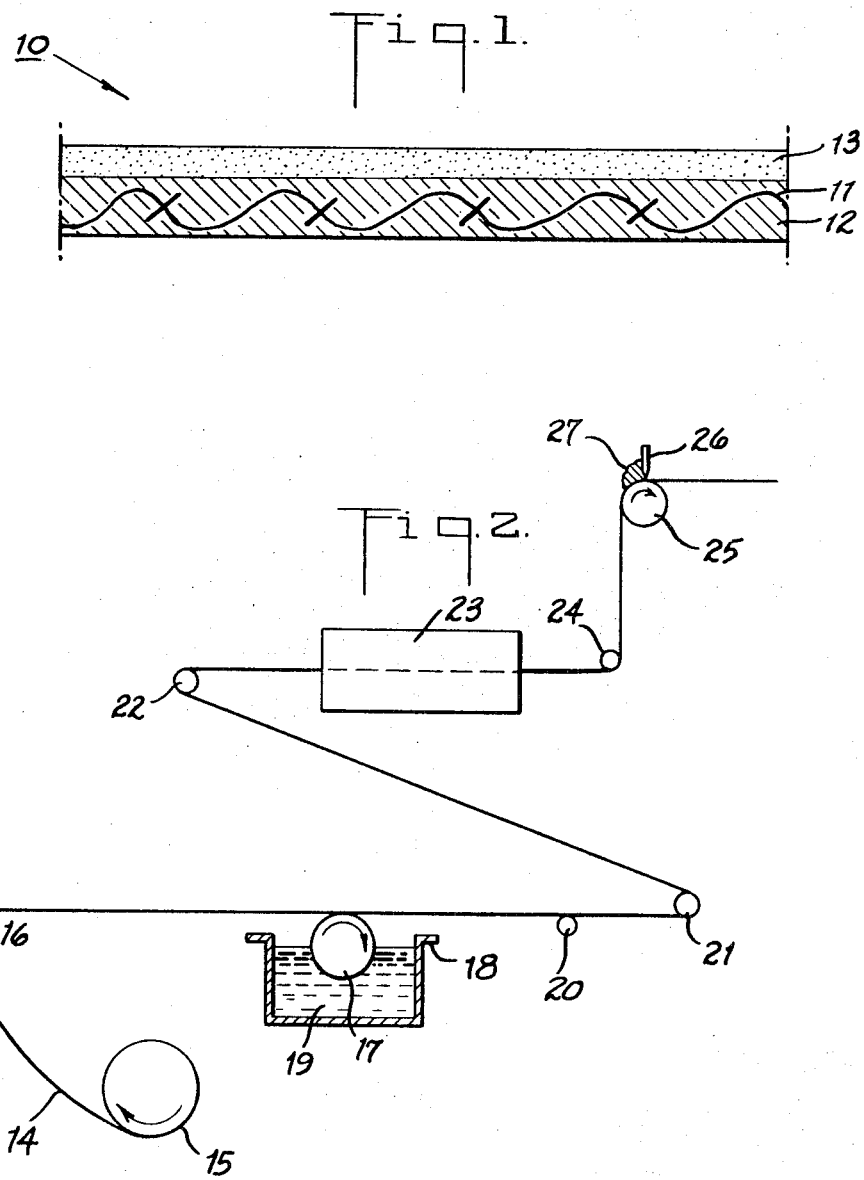

ADHESIVE TAPE AND METHOD OF MAKING SAME

This application is a continuation of application Ser. No. 572,349, filed Aug. 15, 1966, and now abandoned.

This invention relates to a pressure sensitive adhesive tape and a method of making same.

Heretofore, pressure sensitive adhesive tapes have been formed of a multi-layer construction having a backing strip, a release coat layer on one side of the backing strip, an anchor coat layer on an opposite side of the backing strip, and a pressure sensitive adhesive layer on the anchor coat layer. The release coat layer has been made of a low adhesive material relative to the pressure sensitive adhesive layer so that after being wound on itself in a coiled or reel form, the tape could be subsequently uncoiled with relative ease without damaging the pressure sensitive adhesive layer. The anchor coat layer has been made of various elastomeric polymers to bond the pressure sensitive adhesive layer to the backing strip and enable the formation of a tape structure having high internal strength and resistance to separation of the pressure sensitive adhesive from the backing strip. While the anchor coat has been omitted in some instances where the backing strip has been a film structure, the resistance of the pressure sensitive adhesive to separation from the backing strip has been markedly reduced in these instances.

Further, where the backing strip has been made of a liquid-permeable structure, such as a glass fiber cloth, it has been believed that a separate anchor coat has been necessary to the pressure sensitive layer to bond the layer to the backing strip. Consequently, the release coat has been applied to only one side of the backing strip with safeguards against passage through the backing strip to the other side in order to prevent any interference with the anchor coat. The release coat has in some cases been applied after the anchor coat, and in other cases in a carefully controlled manner before the application of the anchor coat.

Generally, the invention avoids the use of a separate anchor coat by providing a tape wherein a pressure sensitive adhesive layer adheres to a release coating which has permeated through to both sides of a liquid permeable backing strip. The method of forming the tape basically consists in soaking a liquid-permeable backing strip with a release coat solution so that the release coat passes through the backing strip and adheres to both sides of the backing strip. Thereafter, the pressure sensitive adhesive layer is adhered to the release coat on one side of the backing strip.

An object of this invention is to provide a pressure sensitive adhesive tape comprising a liquid-permeable backing material saturated with a release coating which does not detract from the adhesion properties of the tape or anchorage of the adhesive to the backing.

It is another object of the invention to provide a pressure sensitive tape having a pressure sensitive layer which possesses a high degree of resistance to separation from a backing strip.

It is another object of the invention to provide a pressure sensitive tape which is supple.

It is another object of the invention to provide a pressure sensitive tape which is free of ravelling edges.

It is another object of the invention to provide a heat resistant pressure sensitive tape for electrical usage.

It is another object of the invention to provide a pressure sensitive tape having good tape properties.

These and other objects and advantages of the invention will become more apparent from the following detailed description and appended claims taken in conjunction with the accompanying drawings in which:

FIG. 1 illustrates an edge view of a tape according to the invention; and

FIG. 2 illustrates a schematic view of an apparatus for making the tape of the invention.

Referring to FIG. 1, the pressure sensitive tape 10 has a flexible liquid-permeable backing strip 11, a release coat 12 which permeates through both sides of the backing strip 11, and a pressure sensitive adhesive layer 13.

The backing strip 11 is of any suitable liquid-permeable material, depending on the use to which the tape is to be subjected. Woven backing strips are particularly desirable according to this invention; however, it will be understood that non-woven liquid-permeable strips, such as felted backing strips, may also be used. When the tape 10 is to be used in an electrical environment, such as for the taping of electrical lead wires, the backing strip 11 is preferably made of a glass fiber material. However, the backing strip 11 can be made of cotton, acetate, or other materials, depending on the use to which the tape is to be put.

The release coat 12 is made from a solution of a low adhesive hydrophobic polyvinyl carbamate, such as disclosed in U.S. Pat. No. 2,532,011, issued Nov. 28, 1950, which is diluted through the use of a solvent such as toluene to a 1 to 3 percent solids concentration to reduce the viscosity of the solution to allow permeation through a woven backing strip. The release coat solution is applied to the backing strip 11 to completely soak the backing strip in a manner to permeate or otherwise pass to both sides to form a release coat layer on each side of the woven backing strip 11 upon a subsequent oven curing step.

It is necessary that the backing strip 11 be liquid permeable so that the release coat solution can soak through from the side to which it is applied to the opposite side of the backing strip and thereby form a layer of release coating material on both sides of the backing strip 11.

The pressure sensitive adhesive layer 13 is formed of any suitable pressure sensitive adhesive material, which may be either thermoplastic or thermosetting, depending on the contemplated use for the tape. For example, thermosetting adhesive materials are used when the tape is to be used in an electrical environment. Various thermosetting adhesive materials are known in the art and can be used according to this invention. For some purposes, a thermoplastic adhesive material is preferable. For example, tapes according to this invention can be made with a high-strength backing member such as cotton cloth or nylon, and can be used as strapping tape for shipping cartons and articles which are to be shipped. In this case, a thermoplastic adhesive material is preferable. Various thermoplastic adhesive materials are known in the art.

The adhesive layer 13 is applied to one side of the backing strip 11 directly to the release coat 12 and subsequently oven cured thereon. The other side of the backing strip 11 remains free of the pressure sensitive adhesive layer material so that the tape 10 can be rolled on itself in a conventional manner with the release coat providing the conventional function.

Referring to FIG. 2, in order to form the tape a backing strip 14 is led off a feed roll 15 and directed by a guide roller 16 over a coating roller 17. The coating roller 17 is rotatably mounted to rotate within a pan 18 filled with a dilute release coat solution 19 for picking up and transferring the solution to the underside of the glass fiber backing strip 14 passing over the roller 17. The release coat solution 19 soaks through the backing strip as the backing strip 14 continues to travel away from the roller 17. Any excess of solution can be wiped from the traveling backing strip by a suitably positioned wiper bar 20 in the path of travel. The soaked glass fiber backing strip is then passed over a pair of guide rolls 21, 22 and directed into a drying oven 23 for curing of the release coat and fixing it to both sides of the glass fiber backing strip 14.

After drying, the release-coated backing strip is directed by a guide roller 24 between a rotatably driven roll 25 and a knife 26. A pressure sensitive adhesive coat solution is applied by the knife 26 to the release-coated side of the backing strip which is opposite the side facing the release coat coating roller 17. A mass 27 of the adhesive coat solution, which is a viscous material of putty-like consistency, is placed above roll 25 and moving backing strip 14 and on the upstream side of knife 26. The adhesive coat solution is spread across the backing strip to form a substantially uniform layer. Thereafter, the backing strip travels to an oven for drying of the pressure sensitive adhesive coat on the release coat of the backing snip. After drying the structure is wound into a spool for use.

The preferred tape of the invention possesses good tape characteristics of adhesion, holding power and cohesion in addition to electrical characteristics of heat resistance, solvent resistance and insulation properties. The tape is also of high strength while being soft and supple so as to easily conform to use. While the tape is especially useful for an electrical environment, because of the low cost to produce the tape and the inherent qualities, the tape can also be used in other environments.

Upon subjection to various adhesion, strength and holding tests, for example, under a standard holding test conducted at 130° C., the tape of the invention has given satisfactory results.

In order to improve the ravelling resistance quality of the tape, a weave-set coating can be applied with the release coat to the woven backing strip. This substantially eliminates any ravelling of the edges of the tape.

It is noted that the anchoring of the pressure sensitive adhesive layer to the release coat provides a tape which is of comparable strength to tapes which utilize an additional anchor coat to bond the pressure sensitive adhesive layer to the backing strip. Because the invention makes it unnecessary to use such anchor coats, a tape of much less cost can be produced. In addition, the tape is more supple than heretofore produced tapes which have used anchor coats.

A surprising feature of this invention is that the release coat 12 does not interfere with good anchorage of the adhesive 13 to the backing strip 11. It would be expected that the release material 12, which minimizes or prevents adhesion of adhesive material from an adjacent layer to the back side of the backing surface 11 when the adhesive is rolled in a roll, would also prevent adhesion of the adhesive material 13 to the backing surface. The reason for this surprising behavior is not known, although one possible explanation is that the adhesive material solution may dissolve portions of the release layer on the adhesive side and permit direct adhesion between the adhesive layer 13 and the backing strip 11. However, applicants do not wish to be bound by a theory of explanation.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

It is believed the above provides a complete description of the invention in such manner as to distinguish it from other inventions and from what is old, and provides a description of the best mode contemplated of carrying out the invention and thereby complies with the Patent Statutes.

We claim:

1. A pressure sensitive adhesive tape for an electrical environment comprising a flexible liquid permeable glass backing strip, a low adhesion polyvinyl carbamate permeating said backing strip to form a release coating on each of the opposite sides of said backing strip and a pressure sensitive adhesive layer secured directly to the release coating on one side of said backing strip.

2. A pressure sensitive adhesive tape comprising:
   a. a woven flexible liquid permeable backing strip of glass fibers;
   b. A low adhesion polyvinyl carbamate release coating permeated through on each side of said backing strip, and
   c. A pressure sensitive adhesive tape secured to said release coating on one side of said backing strip.

* * * * *